US 6,604,007 B2

(12) United States Patent
Leven et al.

(10) Patent No.: US 6,604,007 B2
(45) Date of Patent: Aug. 5, 2003

(54) TEST METHOD FOR VERIFYING CORRECT MATCHING OF AN EXHAUST GAS OXYGEN SENSOR AND A VEHICLE ENGINE

(75) Inventors: Martin Leven, West Bloomfield, MI (US); William J. Morgan, Dewitt, MI (US)

(73) Assignee: General Motors Corporation, Detroit, MI (US)

( * ) Notice: Subject to any disclaimer, the term of this patent is extended or adjusted under 35 U.S.C. 154(b) by 306 days.

(21) Appl. No.: 09/810,047

(22) Filed: Mar. 19, 2001

(65) Prior Publication Data

US 2002/0133242 A1 Sep. 19, 2002

(51) Int. Cl.[7] .................................................. G05B 9/02
(52) U.S. Cl. .............................. 700/79; 700/95; 701/29; 701/101; 702/113
(58) Field of Search ............................ 700/32, 79, 75; 701/29, 101; 702/113, 116

(56) References Cited

U.S. PATENT DOCUMENTS

| | | | | |
|---|---|---|---|---|
| 5,400,639 A | * | 3/1995 | Caron et al. | 73/1.25 |
| 5,492,006 A | * | 2/1996 | Beckett | 73/117.2 |
| 6,448,778 B1 | * | 9/2002 | Rankin | 324/503 |
| 6,481,269 B2 | * | 11/2002 | Maruta et al. | 73/116 |

* cited by examiner

*Primary Examiner*—John Follansbee
*Assistant Examiner*—Ronald D. Hartman, Jr.
(74) *Attorney, Agent, or Firm*—Christopher DeVries

(57) ABSTRACT

An improved assembly method and a corresponding diagnostic method carried out by an electronic engine control module in a factory test setting reliably and inexpensively verifies correct matching of a vehicle engine and an exhaust gas oxygen sensor installed on an exhaust pipe thereof. Heating elements within the oxygen sensors are manufactured so as to exhibit an electrical resistance that is different for each type of sensor. Due to normal part-to-part tolerance variation, the heater resistance of one type of oxygen sensor falls into a first range, and the heater resistance of the other type of oxygen sensor falls into a second range. The electronic control module for each engine is calibrated as part of its overall fuel control calibration, to recognize an oxygen sensor current requirement range corresponding to the respective fuel control (i.e., leaded or unleaded). The electronic control module operates during an initial period of engine operation during factory testing prior to convergence of the first and second resistance ranges to measure the average current supplied to the installed oxygen sensor, and to compare the measured current with the calibrated current requirement range. The comparison is used to set a diagnostic indicator, which is checked to determine if the engine should be directed to the next assembly area or returned to a repair area so that the correct sensor may be installed.

5 Claims, 2 Drawing Sheets

TEST METHOD FOR VERIFYING CORRECT MATCHING OF AN EXHAUST GAS OXYGEN SENSOR AND A VEHICLE ENGINE

TECHNICAL FIELD

This invention relates to a diagnostic method for the production of motor vehicle engines, and more particularly to a method for verifying correct matching of an installed oxygen sensor and a respective engine.

BACKGROUND OF THE INVENTION

In mass production of motor vehicles, a variety of vehicle types and models are commonly produced on the same assembly line. This can present a problem because many of the components designed for one type or model of vehicle will malfunction or operate incorrectly if installed in a different type or model of vehicle. Accordingly, various precautions must be taken to ensure that the correct components are installed in each vehicle. The focus of this invention concerns engine exhaust gas oxygen sensors. When an assembly line is designed to accommodate both engines configured to run on leaded fuel and engines configured to run on unleaded fuel, two different types of oxygen sensors must be on hand. Unfortunately, it is difficult to distinguish between the two sensor types, and it is possible that the wrong sensor could be installed in a given vehicle. There are various possible arrangements for preventing improper sensor installation, such as providing unique wiring harnesses and/or connectors for each type of vehicle, but such arrangements are undesirable because they increase both component proliferation and cost. Accordingly, what is needed is a method of reliably and cost effectively verifying proper matching of a vehicle engine and its exhaust gas oxygen sensor.

SUMMARY OF THE INVENTION

The present invention is directed to an improved assembly method and a corresponding diagnostic method carried out by an electronic engine control module in a factory test setting for reliably and inexpensively verifying correct matching of a vehicle engine and an exhaust gas oxygen sensor installed on an exhaust pipe thereof. According to the invention, heating elements within the oxygen sensors are manufactured so as to exhibit an electrical resistance that is different for each type of sensor. Due to normal part-to-part tolerance variation, the heater resistance of one type of oxygen sensor falls into a first range, and the heater resistance of the other type of oxygen sensor falls into a second range. The electronic control module for each engine is calibrated as part of its overall fuel control calibration to recognize an oxygen sensor current requirement range corresponding to the respective fuel control (i.e., leaded or unleaded). The first and second resistance ranges tend to converge as the temperature of the sensors rise above a given value during operation of the engine, and the electronic control module operates during an initial period of engine operation during factory testing prior to convergence of the first and second resistance ranges to measure the average current supplied to the installed oxygen sensor, and to compare the measured current with the calibrated current requirement range. The comparison is used to set a diagnostic indicator, which is checked to determine if the engine should be directed to the next assembly area or returned to a repair area so that the correct sensor may be installed.

DESCRIPTION OF THE PREFERRED EMBODIMENT

Figure 1:
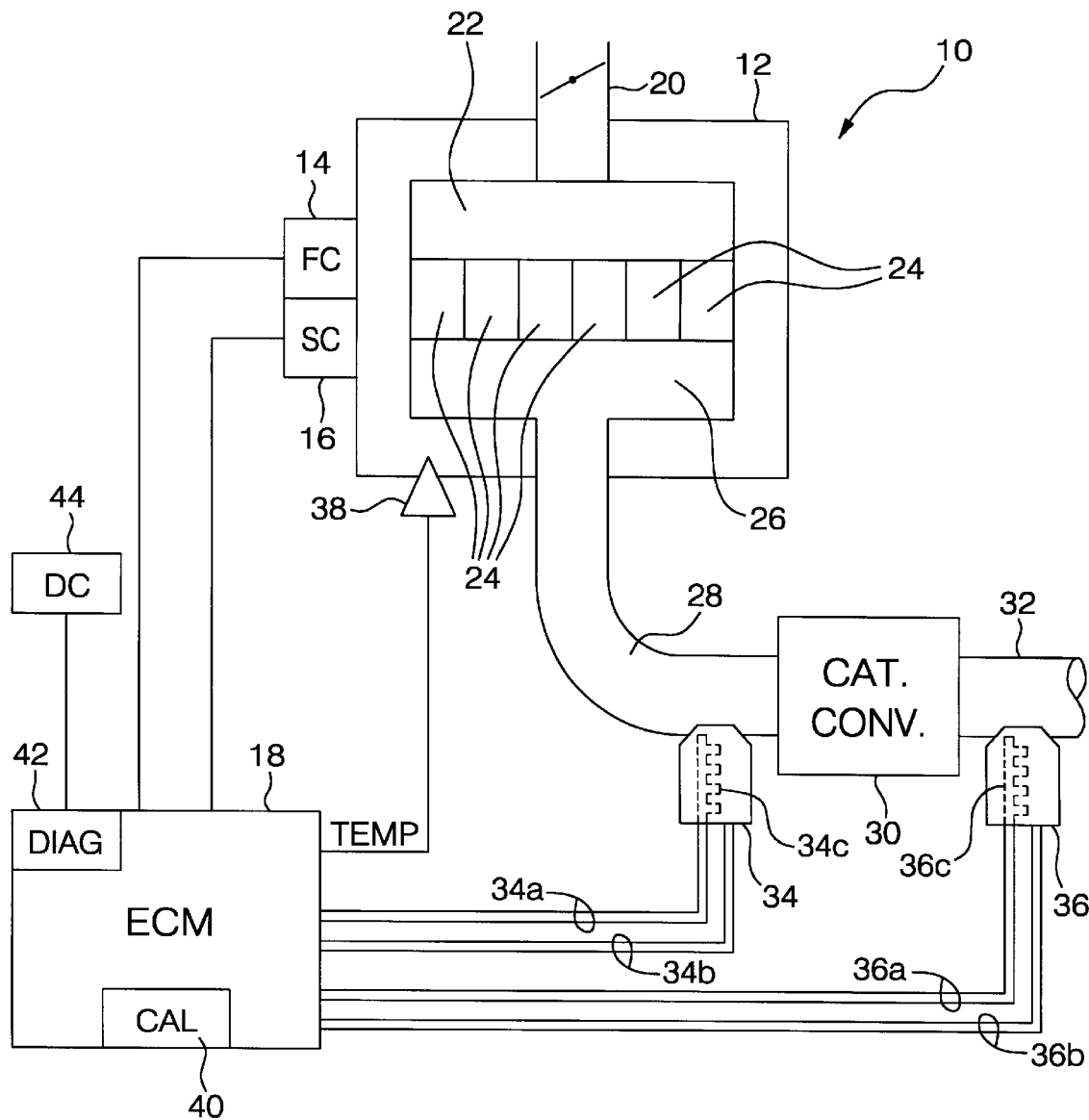
FIG. 1 is a schematic diagram of a vehicle powertrain, including an electronic control module programmed to carry out the control of this invention.

Referring to the drawings, and particularly to FIG. 1, the reference numeral 10 generally designates a portion of a vehicle drive train including a multi-cylinder internal combustion engine 12 having conventional fuel control (FC) and spark control (SC) mechanisms 14 and 16 operated under the control of a microprocessor-based electronic control module (ECM) 18. Air ingested through throttle 20 enters intake manifold 22 for distribution to the various engine cylinders 24 along with an appropriate quantity of fuel. After combustion of the air/fuel mixture, the combustion products (exhaust gases) pass through exhaust manifold 26, header pipe 28, catalytic converter 30, and tailpipe 32. Catalytic converter 30 is designed to reduce tailpipe emissions, and provides optimum performance when ECM 18 maintains the engine air/fuel ratio within a specified range. The ECM 18 performs the air/fuel control by analyzing a variety of input signals, including signals produced by a first exhaust gas oxygen sensor 34 located upstream of catalytic converter 30 in header pipe 28 and a second exhaust gas oxygen sensor 36 located downstream of catalytic converter 30 in tailpipe 32. Another pertinent input signal shown in FIG. 1 is a coolant temperature signal (TEMP) obtained from a suitable temperature sensor 38. In carrying out the fuel and other controls, ECM 18 relies on a number of calibration parameters, which are typically stored in a section of non-volatile memory (CAL), designated in FIG. 1 by the reference numeral 40. Finally, ECM 18 is also programmed to carry out a number of diagnostic routines for testing the operation of various powertrain components, and the results of such routines are typically stored in a section of non-volatile memory (DIAG) designated in FIG. 1 by the reference numeral 42 which is accessible to service instrumentation via diagnostic connector (DC) 44.

The exhaust gas oxygen sensors 34, 36 are each coupled to ECM 18 via first and second conductor pairs 34a, 34b and 36a, 36b. The first conductor pairs 34a, 36a are coupled to heater elements 34c, 36c within the respective sensors, and ECM 18 supplies current to the heater elements 34c, 36c via such conductor pairs during operation of engine 12. The second conductor pairs 34b, 36b receive the respective sensor output signals, and provide them as inputs to ECM 18 for fuel control purposes, as mentioned above.

The method of this invention is principally directed to a diagnostic routine carried out by ECM 18 for verifying that the oxygen sensors 34 and 36 are correctly matched to the fuel on which engine 12 is designed to operate (i.e., leaded or unleaded fuel). In addition to the diagnostic routine carried out by ECM 18, the method of this invention requires that the oxygen sensor heating elements 34c, 36c be manufactured to exhibit an electrical resistance that is different for each type of sensor. For example, oxygen sensor heaters designed for operation with leaded fuel may have a nominal resistance of 6 ohms at ambient temperature, whereas oxygen sensor heaters designed for operation with unleaded fuel may have a nominal resistance of 13 ohms at ambient temperature. Due to normal part-to-part tolerance variation, the heater resistance of one type of oxygen sensor falls into a first range, and the heater resistance of the other type of oxygen sensor falls into a second range. At ambient temperatures, the first and second resistance ranges are reliably distinguishable, but tend to converge as the heater elements 34c, 36c near their normal operating temperatures. Of course, the magnitude of current supplied to the heater elements 34c, 36c is inversely proportional to their resistance, and the control of the present invention involves measuring the current supplied to the respective heater elements of sensors 34 and 36 during a predetermined time period beginning at engine start-up. The measured current is averaged and compared to a calibration value stored in ECM 18 that corresponds to the resistance range that should be observed. The result of the comparison sets or clears a flag in the diagnostic portion (DIAG) of the ECM's non-volatile memory, and the state of the flag is read by a suitable test instrument coupled to the diagnostic connector 44. If the flag indicates a "passed" test, the engine or vehicle is directed to the next assembly area. If the flag indicates a "failed" test, the engine or vehicle is returned to a repair area so that the correct oxygen sensor may be installed; at this time the diagnostic routine is reset by the test instrument, and the engine is started to re-initiate the test.

Figure 2:
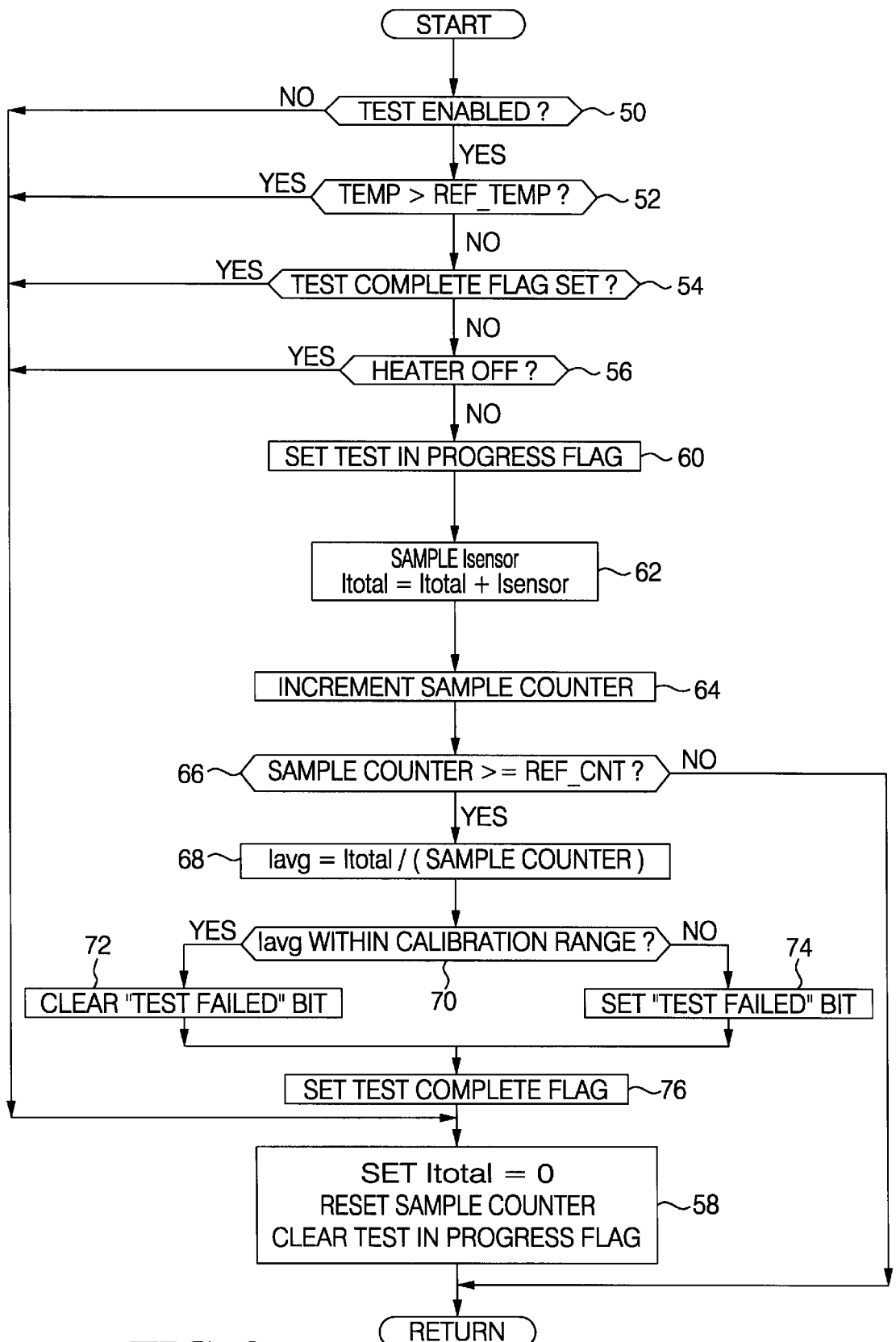
FIG. 2 is a flow diagram representative of computer program instructions executed by the electronic control module of FIG. 1 in carrying out the control of this invention.

The flow diagram of FIG. 2 illustrates the diagnostic routine as a series of instructions that are periodically executed by ECM 18 according to this invention when power is applied to ECM 18 during an engine test sequence. At such point, the engine 12 has been fully assembled and equipped with oxygen sensors 34, 36, and various calibration parameters, including an oxygen sensor resistance range parameter, have been stored in the calibration portion (CAL) 40 of the ECM's non-volatile memory. Initially, the block 50 is executed to determine if the test is enabled; this may involve, among other things, determining that the electrical voltage applied to ECM 18 is within a predetermined range. If block 50 is answered in the affirmative, blocks 52, 54 and 56 check a number of other conditions to determine if the test should be initiated or terminated. The block 52 determines if the temperature input TEMP is above a reference temperature REF_TEMP. The block 54 determines if a test flag referred to as the TEST COMPLETE flag is set, and block 56 determines if the respective sensor heater 34c, 36c is off. The temperature comparison of block 52 is used to detect a condition where the engine (and oxygen sensors) are already hot due to prior operation of engine 12; this condition would preclude reliable identification of the ambient oxygen sensor resistance, and the test is only permitted if TEMP≦REF_TEMP. The "heater off" determination of block 56 makes sure that current is being supplied to the respective heater 34c, 36c before allowing the test. The heaters 34c, 36c are only operated after engine 12 has been started, so block 56 will be answered in the negative when power is first applied to ECM 18 as part of the test sequence. Accordingly, block 58 will be executed in the first several passes through the test routine to reset various system parameters. Specifically, a cumulative current parameter Itotal is reset to zero, a SAMPLE COUNTER for counting the number of current samples accumulated is reset, and the TEST IN PROGRESS flag is cleared to indicate that a test is not in progress. As indicated, block 58 is also executed when block 50 is answered in the negative (test not enabled), block 52 is answered in the affirmative (TEMP>REF_TEMP), or block 54 is answered in the affirmative (TEST COMPLETE flag set).

Once the initial conditions defined by blocks 50, 52, 54 and 56 have been satisfied, the blocks 60 and 62 are executed to set the TEST IN PROGRESS flag, to sample the current Isensor supplied to a respective heater, and to set the cumulative current parameter (Itotal) for that heater to the sum (Itotal+Isensor). The current Isensor is typically measured internal to ECM 18 for other diagnostic purposes, but could alternatively be measured externally with a shunt resistor, for example. Blocks 64 and 66 then increment the SAMPLE COUNTER, and compare it to a reference count REF_CNT. Initially, of course, SAMPLE COUNTER <REF_CNT, and the remainder of the routine is skipped. In subsequent executions of the routine, assuming that the test conditions continue to be met, the blocks 62 and 64 will be executed as described above, and block 66 will eventually be answered in the affirmative. At such point, a given number (REF_CNT) of current samples (Isensor) will have been accumulated in the variable Itotal, and block 68 is executed to compute an average current Iavg according to the quotient (Itotal/SAMPLE COUNTER). The block 70 then compares Iavg with the corresponding calibration range parameter stored in ECM 18. If Iavg is within the stored calibration range, the correct oxygen sensor has been installed, and the block 72 clears a TEST FAILED bit (flag) in the diagnostic memory 42. If Iavg is outside the stored calibration range, the wrong oxygen sensor (or a faulty oxygen sensor) has been installed, and the block 74 sets the TEST FAILED bit. In either case, blocks 76 and 58 are then executed to set the TEST COMPLETE flag, to set Itotal to zero, to reset the SAMPLE COUNTER, and to clear the TEST IN PROGRESS flag. In subsequent executions of the routine, the block 54 will be answered in the affirmative, and the test will not be repeated. In the event the wrong sensor is identified, service personnel may reset (clear) the TEST COMPLETE flag, and then re-start the engine 12 to reinitiate the above-described test.

In summary, the test method of this invention provides a practical and cost-effective solution for verifying in a factory setting that the correct oxygen sensor has been installed in a vehicle engine. While described in reference to the illustrated embodiment, it is expected that various modifications in addition to those mentioned above will occur to those skilled in the art. In this regard, it will be understood that the scope of this invention is not limited to the illustrated embodiment, and that control methods incorporating such modifications may fall within the scope of this invention, which is defined by the appended claims.

What is claimed is:

1. A test method for verifying correct production of engines having first and second fueling characteristics, wherein fueling of each of the engines is controlled by a respective electronic control module, wherein engines having the first fueling characteristic are designed to be equipped with a first type of exhaust gas oxygen sensor, and engines having the second fueling characteristic are designed to be equipped with a second type of exhaust gas oxygen sensor, and wherein each such exhaust gas oxygen sensor includes a heater element that is supplied with electrical current by the respective electronic control module during operation of a respective engine, the test method comprising the steps of:

specifying an electrical resistance of the heater elements of said first and second types of exhaust gas oxygen sensors such that the electrical resistance of the heater elements for the first type of exhaust gas oxygen sensor fall in a first range, and the electrical resistance of the heater elements for the second type of exhaust gas oxygen sensor fall in a second range;

storing a calibration parameter in the electronic control module for each engine, where the parameter stored in engines having the first fueling characteristic corresponds to said first range of electrical resistance, and the parameter stored in engines having the second fueling characteristic corresponds to said second range of electrical resistance;

starting a produced engine equipped with an exhaust gas oxygen sensor;

detecting an electrical current supplied to the equipped exhaust gas oxygen sensor by the respective electronic control module;

comparing the detected electrical current to the calibration parameter stored in the respective electronic control module; and indicating that the equipped exhaust gas oxygen sensor matches the produced engine if the detected electrical current matches the stored calibration parameter, and that the equipped exhaust gas oxygen sensor fails to match the produced engine if the detected electrical current does not match the stored calibration parameter.

2. The test method of claim 1, wherein the step of detecting the electrical current supplied to the equipped exhaust gas oxygen sensor comprises the steps of:

periodically sampling values of electrical current supplied to the equipped exhaust gas oxygen sensor during a predefined period beginning when the respective electronic control module starts supplying electrical current to the equipped exhaust gas oxygen sensor;

accumulating the periodically sampled values of electrical current; and at an end of said predefined period, calculating an average current based on the accumulated sampled values.

3. The test method of claim 2, wherein the end of said predefined period occurs when a predetermined number of said electrical current values have been sampled.

4. The test method of claim 1, including the step of:

disabling the detecting, comparing and indicating steps if a temperature of the produced engine exceeds a reference temperature.

5. The test method of claim 1, including the steps of:

indicating completion of the test method after indicating that the equipped exhaust gas oxygen sensor matches or fails to match the respective engine; and disabling the detecting, comparing and indicating steps after completion of the test method has been indicated.

* * * * *